(12) United States Patent
Agarwal et al.

(10) Patent No.: US 9,463,978 B2
(45) Date of Patent: *Oct. 11, 2016

(54) PROCESS FOR MAKING TRISILYLAMINE

(71) Applicant: AIR PRODUCTS AND CHEMICALS, INC., Allentown, PA (US)

(72) Inventors: Rajiv Krishan Agarwal, Malvern, PA (US); Sai-Hong Andrew Lo, Allentown, PA (US); Howard Paul Withers, Jr., Breinigsville, PA (US); Joseph T. Sluzevich, Frackville, PA (US); James Joseph Hart, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,224

(22) Filed: Feb. 2, 2016

(65) Prior Publication Data
US 2016/0145102 A1     May 26, 2016

Related U.S. Application Data

(62) Division of application No. 14/284,983, filed on May 22, 2014, now Pat. No. 9,284,198.

(60) Provisional application No. 61/840,940, filed on Jun. 28, 2013.

(51) Int. Cl.
| C07F 7/10 | (2006.01) |
| C01B 21/087 | (2006.01) |
| B01J 8/24 | (2006.01) |
| B01J 8/00 | (2006.01) |
| B01J 8/10 | (2006.01) |
| B01J 8/02 | (2006.01) |

(52) U.S. Cl.
CPC .......... *C01B 21/087* (2013.01); *B01J 8/0015* (2013.01); *B01J 8/02* (2013.01); *B01J 8/10* (2013.01); *B01J 8/24* (2013.01); *B01J 2208/00761* (2013.01); *B01J 2208/00823* (2013.01)

(58) Field of Classification Search
CPC ........ C07F 7/10; C01B 21/087; C01C 1/164
USPC ....................................... 556/414
See application file for complete search history.

(56) References Cited

U.S. PATENT DOCUMENTS

| 6,051,729 | A | 4/2000 | Weidner et al. |
| 8,409,513 | B2 | 4/2013 | Miller |
| 8,461,367 | B2 * | 6/2013 | Hamada ............... C01B 21/087 556/412 |
| 2010/0310443 | A1 | 12/2010 | Miller |
| 2011/0136347 | A1 | 6/2011 | Kovarsky et al. |
| 2011/0178322 | A1 | 7/2011 | Hamada et al. |
| 2013/0010443 | A1 | 1/2013 | Takamura et al. |
| 2013/0089487 | A1 | 4/2013 | Ritter, III |
| 2014/0161705 | A1 | 6/2014 | Hoppe et al. |

FOREIGN PATENT DOCUMENTS

| JP | 53117693 | 10/1978 |
| JP | H1240888 | 9/1999 |
| JP | 2011162543 | 8/2011 |
| JP | 2012528785 | 11/2012 |
| JP | 2014528898 | 10/2014 |
| WO | 2010141551 | 12/2010 |
| WO | 2012156191 | 11/2012 |
| WO | 2013004423 | 1/2013 |
| WO | 2013052673 | 4/2013 |

OTHER PUBLICATIONS

A. Stock, et al, "Siliciumwasserstoffe, X.: Stickstoffhaltige Verbindungen", C. Ber. Dtsch. Chem Ges., 1921, 54, 740-758.
B. Aylett, et al, "The Preparation and Some Properties of Disilylamine", Inorg Chem, 1966, 5(1), 167.
R.L. Wells, et al, "Studies of Silicon-Nitrogen Compounds. The Base-Catalyzed Elimination of Silane From Trisilylamine", Journal of the American Chemical Society, 1966, 88(1), 37-42.

* cited by examiner

*Primary Examiner* — Porfirio Nazario Gonzalez
*Assistant Examiner* — Kofi Adzamli
(74) *Attorney, Agent, or Firm* — Michael K. Boyer

(57) ABSTRACT

The method described herein provides a method for preparing trisilylamine. In one aspect, the method comprises: providing a reaction mixture of trisilylamine and monochlorosilane into a reactor wherein the reaction mixture is at a temperature and pressure sufficient to provide trisilylamine in a liquid phase wherein the reaction mixture is substantially free of an added solvent; contacting the reaction mixture with ammonia to provide a crude mixture comprising trisilylamine and an ammonium chloride solid wherein monochlorosilane is in stoichiometric excess in relation to ammonia; purifying the crude mixture to provide trisilylamine wherein the trisilyamine is produced at purity level of 90% or greater; and optionally removing the ammonium chloride solid from the reactor.

20 Claims, 1 Drawing Sheet

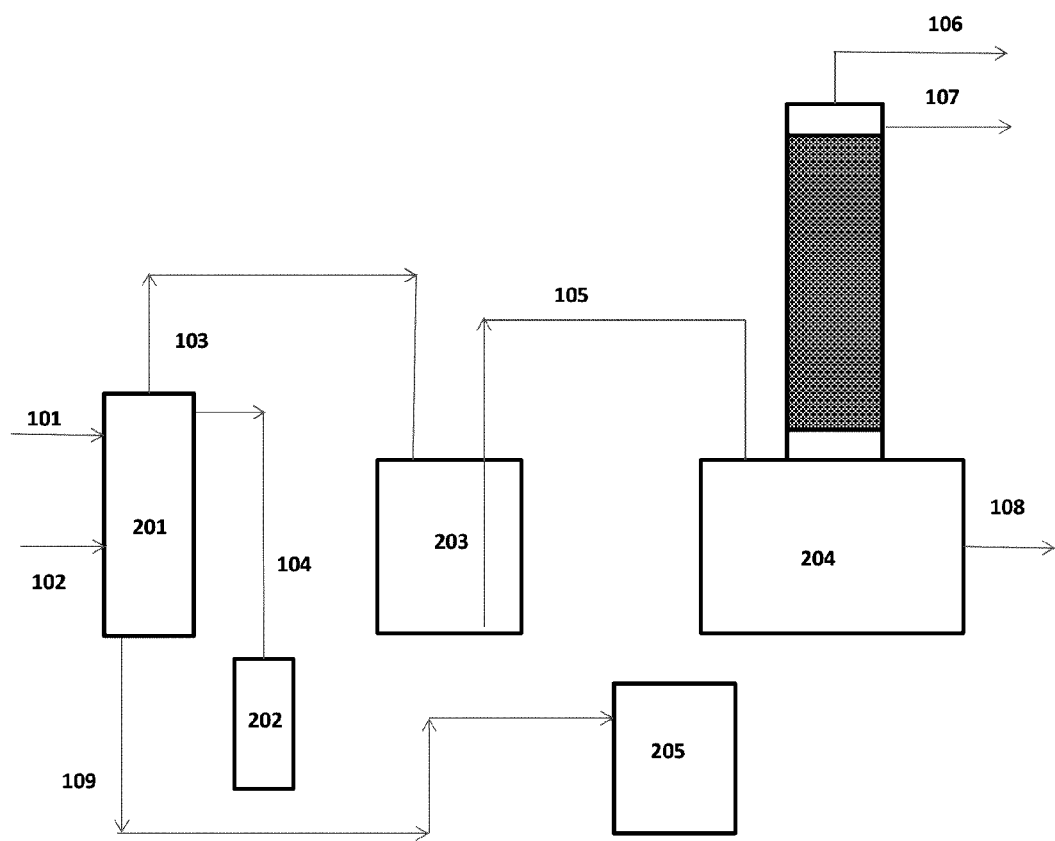

PROCESS FOR MAKING TRISILYLAMINE

CROSS REFERENCE TO RELATED APPLICATIONS

The present patent application is a divisional application of U.S. patent application Ser. No. 14/284,983, which was filed on May 22, 2014.

This patent application claims the priority benefit under 35 U.S.C. §119 of U.S. Provisional Patent Application Ser. No. 61/840,940 filed 28 Jun. 2013.

BACKGROUND OF THE INVENTION

Described herein are methods for making a silylamine, more specifically trisilylamine. Trisilylamine (($SiH_3$)$_3$N or "TSA") is a precursor that is finding use in the deposition of high purity silicon oxide films for gap fill applications in the semiconductor industry. Trisilylamine is a reactive precursor that does not require direct plasma excitation for film growth.

Stock, A.; Somieski, C. Ber. Dtsch. Chem. Ges. 1921, 54, 740 reported synthesis of TSA by a reaction of monochlorosilane (MCS) with ammonia ($NH_3$) as shown by Equation (1):

$$3SiH_3Cl + 4NH_3 \rightarrow (SiH_3)_3N + 3NH_4Cl \qquad (1)$$

The above reference reported principal formation of DSA [($SiH_3$)$_2$NH] in excess ammonia. DSA also was shown to decompose to $SiH_4$ and polymeric silicon compounds or polysilazanes as shown by Equation (2):

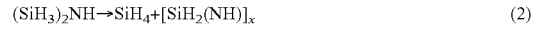

$$(SiH_3)_2NH \rightarrow SiH_4 + [SiH_2(NH)]_x \qquad (2)$$

In the presence of excess ammonia, polysilazanes, $SiH_4$, DSA are the likely products. TSA and polysilazanes react violently with water to make $SiO_2$, $H_2$ and $NH_3$. Depending on the polymer chain, the polysilazanes can be a volatile liquid to solid. Their vapor pressure is lower than TSA.

US Publ. No. 2011/0136347 ("the '347 publication") describes a process for the production and delivery of a reaction precursor containing one or more silylamines such as TSA near a point of use. The process described in the '347 publication is conducted in gas and/or liquid phase at a temperature ranging from about −80° C. to about room temperature. The '347 publication further teaches adding an inert gas or using an organic solvent in the reaction vessel to reduce the formation of oligomers in the form ($SiH_2NH$)$_n$.

U.S. Pat. No. 8,409,513 ("the '513 Patent") describes a tubular flow reactor and a process for the synthesis of silylamines such as TSA. According to the '513 patent, the reactor has a unique combination of characteristics found in plug flow and laminar flow devices. The reaction of ammonia with molar excess MCS was carried out at low pressure in gas phase.

The reference entitled "The Preparation and Some Properties of DiSilylamine", B. J. Aylett, et al., Inorganic Chemistry, Vol. 5(1), p. 167 (1966) reported that DSA did not convert to TSA in gas phase even at 150° C. However, at 0° C., DSA was shown to convert to TSA. At 0° C., DSA will condense to a liquid.

U.S. Publ. No. 2013/0089487 ("the '487 publication") describes a condensed phase batch process for synthesis of TSA. The process of the '487 publication incorporates a solvent such as anisole to act as a heat-transfer medium in which the ammonium chloride salt is dispersed and downstream product removal is devoid of salt formation.

To obtain high purity trisilylamine, it is important to minimize the formation of DSA, use excess MCS to complete the reaction to TSA, and minimize formation of polysilazanes from decomposition of DSA. To increase productivity and production volume, intermediate formation should be minimized during synthesis to speed the process. TSA synthesis via reaction (1) results in significant formation of ammonium chloride. For 1 unit weight of TSA, 1.5 unit weight of ammonium chloride is formed. Any polysilazanes formed will be heavies and can remain part of ammonium chloride matrix. Safe handling of the solid ammonium chloride requires minimization of polysilazane formation, safe and efficient method to remove polysilazanes from ammonium chloride prior to ammonium chloride disposal. Crude TSA is further purified to obtain high purity TSA as needed by customers.

BRIEF SUMMARY OF THE INVENTION

Methods for preparing a TSA at high purity levels are described herein. The methods described herein minimize formation of intermediate DSA and byproduct polysilazanes. The methods described herein also operate under pressure and temperature conditions where the production rate of TSA is significantly enhanced over known art. At these pressure and temperature conditions, TSA is present as a liquid in the reactor and the reaction takes place in condensed phase wherein TSA itself acts as a solvent to increase reaction kinetics. In this regard, no additional solvent is added to the reaction mixture and the reaction mixture is substantially free of added solvent. It has been found that MCS is soluble in TSA and the rate of reaction of MCS with ammonia to make TSA is increased; DSA formation is minimized and reaction kinetics is significantly enhanced.

In one aspect, there is provided a method for preparing trisilylamine, the method comprising: providing a reaction mixture of trisilylamine and monochlorosilane into a reactor wherein the reaction mixture is at a temperature and pressure sufficient to provide trisilylamine in a liquid phase wherein the reaction mixture is substantially free of an added solvent; contacting the reaction mixture with ammonia to provide a crude mixture comprising trisilylamine and an ammonium chloride solid wherein monochlorosilane is in stoichiometric excess in relation to ammonia; purifying the crude mixture to provide trisilylamine wherein the trisilyamine a purity level of 90% or greater; and optionally removing the ammonium chloride solid from the reactor. In one particular embodiment, the reaction mixture comprises up to 30% by weight stoichiometric excess, or from about 3% to about 5% by weight stoichiometric excess, of monochlorosilane relative to ammonia.

BRIEF DESCRIPTION OF SEVERAL VIEWS OF THE DRAWINGS

FIG. 1 is a process flow schematic of the one embodiment of the method described herein.

DETAILED DESCRIPTION OF THE INVENTION

Methods for preparing trisilylamine ("TSA") in a reactor comprising TSA, in liquid phase which acts as a solvent, is disclosed herein. The reaction provides a crude mixture comprising TSA. The purity of the crude mixture comprising TSA can vary depending upon the reagents in a reactor, e.g., a purity level of 70% or greater, 75% or greater, 80% or greater, 85% or greater, 90% or greater, 95% or greater, 99% or greater as measured by gas chromatography (GC). The crude mixture can be further purified by distillation or other means to obtain the final, high purity TSA product, e.g., a purity level of 90% or greater, 95% or greater, 99% or greater, 99.9% or greater as measured by GC. The methods described herein overcome the drawbacks of previous methods for selectively preparing trisilylamine which was previously prepared only in the gas phase of TSA. For example, during gas phase, the reaction cycle time is longer and/or does not reach completion. In comparison to earlier methods for preparing trisilylamine, such as methods wherein the TSA is present in the gaseous phase, the method described herein minimizes the formation of undesirable intermediates products such as DSA. The method described herein further enables the direct production of TSA at high purity levels appropriate to the industry. The method described herein also avoids the use of an additional added solvent by using TSA itself, preferably in liquid-phase, as the solvent in the reaction mixture.

The methods described herein operate under pressure and temperature conditions where the production rate of TSA is significantly enhanced over known art. At the pressure and temperature conditions described herein, TSA is present as a liquid in the reactor and the reaction takes place in the condensed phase where TSA itself acts as a solvent to increase the reaction kinetics. The TSA can be provided to the reactor in gaseous phase, liquid phase, or combination thereof. It has been found that MCS (see Example 1 described herein) is soluble in TSA and that this promotes the reaction of MCS with ammonia to make TSA. A further benefit is that the DSA formation is minimized which also significantly enhances reaction kinetics. Additionally, the amount of undesirable by-product polysilazane formation is also minimized.

FIG. 1 is a process flow schematic of one embodiment of the method described herein. Referring to FIG. 1, the main elements of the production process for TSA are the following: reactor (201), trap (202), optional TSA collector (203), distillation column (204) and vacuum conveyor (205). The process chemicals used in the embodiment shown in FIG. 1 are the following: MCS feed is 101; ammonia feed is 102; the flow of the crude mixture comprising TSA is 103 and may further comprise MCS and trace DSA as measured by GC; 104 is a high boiling residue from the reactor that is neutralized for safe disposal and contains TSA mixed with polysilazanes; 105 is also crude TSA in case a collector is used as an intermediate collection point; 106 is a light impurity from batch distillation column and contains mainly MCS, trace DSA and some TSA as measured by GC; 107 is pure TSA; and 108 is material remaining in reboiler containing by-products that boil higher than TSA. Figure number 109 is the ammonium chloride solids that is removed from the reactor via vacuum conveying using vacuum conveyor 205 as described herein or other means.

Synthesis of TSA is a very exothermic process and localized heating can occur where TSA formation happens. Multiple thermocouples are placed in the reactor to ensure reaction temperature does not exceed the desired set point. US Publ. No. US Publ. 2011/0178322A1("the '322 publication") describes a thermal decomposition process to make TSA wherein perhydropolysilazane is thermally decomposed at temperatures <600° C., preferably at 300° C. to produce stable TSA. This suggests that TSA itself is stable at high temperatures. By contrast, in the method described herein, the reactor temperature was limited to 120° C. At higher temperatures (greater than 120° C.), MCS itself may disproportionate and make dichlorosilane and silane as shown below in Equation (3):

$$2SiH_3Cl \leftarrow\rightarrow SiH_4 + SiH_2Cl_2 \qquad \text{Equation (3)}$$

In the above reaction, the product DCS ($SiH_2Cl_2$) will also react with ammonia to result in polysilazanes while silane is a net yield loss. The reaction of Equation (3) is accelerated at temperatures above 120° C.

The reaction for the method described herein occurs at one or more temperatures ranging from about 20° C. to about 120° C. Exemplary temperatures for the reaction include ranges having any one or more of the following endpoints: 20, 30, 40, 50, 60, 70, 80, 90, 100, 110, and 120° C. Examples of particular reactor temperature ranges include but are not limited to, 20° C. to 120° C. or from 70° C. to 120° C. In certain embodiments, the reaction occurs at room temperature or about 25° to about 30° C.

In certain embodiments of the method described herein, the pressure of the reaction may range from about 0.1 to about 115 psia. Exemplary pressures for the reaction include ranges having any one or more of the following endpoints: 0.1, 0.5, 1, 5, 10, 20, 30, 40, 50, 60, 70, 80, 90, 100, 110, and 115 psia.

In certain embodiments of the method described herein, monochlorosilane is in stoichiometric excess in relation to ammonia; more particularly up to about 30% by weight stoichiometric excess. In one particular embodiment, the reaction mixture comprises up to 30% by weight stoichiometric excess, or from about 3% to about 5% by weight stoichiometric excess, of monochlorosilane relative to ammonia. Exemplary weight percentages for the stoichiometric excess include ranges having any one or more of the following endpoints: 0.5, 1, 1.5, 2, 2.5, 3, 4, 5, 7.5, 10, 15, 20, 25, and 30 percent by weight. In these embodiments, the molar excess of MCS should be maintained for both batch and continuous processes.

To enhance the reaction rate, the methods described herein conduct the reaction in condensed TSA where TSA acts as a solvent facilitator of the reaction. In contrast to other prior art processes, no solvent is added to the reaction mixture because the TSA acts as the solvent within the reaction. The reaction mixture is substantially free or contains less than 2% by weight, 1% by weight, or 0.5% by weight of added solvent. In an enclosed vessel and at 30° C., 1.7 grams/liter (g/l) or 0.017 grams/cubic centimeters (g/cc) of TSA is required density for incipient liquid formation. The density of TSA can range from about 1.7 g/l to about 100 g/l, or from about 2.0 g/l to about 100 g/l, or from about 2.0 g/l to about 30 g/l, or about 20 g/l to about 30 g/l. At lower reaction temperatures, the required density will be lower. In one particular embodiment, it was found that solubility of MCS in TSA was approximately 20% by weight (see Example 1). Solubility is a function of temperature and pressure and will vary according to process conditions. Experiments conducted where condensed TSA was present in a reactor showed very high conversion rates of MCS and ammonia to TSA. In cases where the density of TSA in the reactor was >20 g/l, only trace amount (<1%) of DSA was noted in the gas phase as soon as reaction was stopped (see Example 2). Since DSA is lighter than TSA and will accumulate more in the gas phase, the amount of liquid phase DSA present will be even less.

The method for making TSA described herein is not limited to a batch process. In another embodiments, the method described herein can be run continuously with high selectivity and yield by optimizing the contact time between the condensed TSA, MCS, and ammonia in a flow system to maximize reaction rate while minimizing by-product formation. The end product composition and yield can be optimized to meet the user's needs by varying one or more of the following conditions: MCS:NH$_3$ ratio, temperature, and pressure. Continuous feed of MCS and ammonia can also be introduced in the reactor as long as there is condensed TSA present in the reactor to facilitate reaction completion. Since condensed TSA promotes and enhances its synthesis, it may also be used as a solvent to facilitate TSA synthesis. In this embodiment, a pool of TSA can be transferred to the reactor before reaction and MCS and ammonia can be sparged in TSA to produce more TSA. The reaction can be carried out in stirred reactor to enhance mixing and improve heat transfer. Slight excess of MCS must be used at all times to prevent TSA decomposition in the presence of excess ammonia. As reaction proceeds, slurry of ammonium chloride with TSA will form. This slurry can be filtered periodically to remove ammonium chloride and return crude TSA back to the reactor for further production of TSA.

Once the reaction is completed, crude TSA can be transferred from the reactor. Crude TSA can be boiled off from the reactor under temperature and/or pressure gradient. The boiling process is relatively straightforward as TSA latent heat of evaporation is low and estimated at 60 cal/gm. Referring to the embodiment in FIG. 1, crude TSA can be collected in an optional condenser (203) or can be collected in the reboiler sump of the distillation column (204). In the embodiment shown in FIG. 1, boil up of crude TSA has not been found to be hampered by solid ammonium chloride that is present in the reactor. The optional condenser may be used to facilitate high production manufacture where distillation and reaction can then be carried out simultaneously. During transfer of the crude mixture comprising TSA, the reactor can be warmed to one or more temperatures ranging from 50 to 100° C. while the condenser can be cooled to one or more temperatures of −40° C. or less to allow for rapid transfer of the crude mixture comprising TSA from reactor to condenser. No moving parts are needed during this operation. Once the crude mixture comprising TSA has been transferred out of the reactor, solid ammonium chloride remains in the reactor and can be removed safely from the reactor. Solid ammonium chloride contains sorbed TSA and polysilazanes that can release energy when exposed to air for disposal. In the embodiment shown in FIG. 1, trap (202) is used to remove sorbed TSA and polysilazane. The trap can be cooled to liquid nitrogen temperature for effective transfer of sorbed TSA and polysilazane from solid ammonium chloride to the trap. The yield loss is estimated at from about 4 to about 9% by weight due to sorbed TSA and polysilazane. Trapped TSA and polysilazane can be disposed of by, hydrolysis or other suitable means, in a safe and secure manner. Solid ammonium chloride, once exposed to air in a controlled manner to oxidize residual sorbed TSA and polysilazanes, can then be removed from the reactor safely and efficiently.

To ensure the rapid turnaround of the reactor for further TSA synthesis, the solid ammonium chloride can be removed from the reactor in an in-situ manner. Excess amount of solid ammonium chloride in the reactor was found to result in blockages in gas spargers. Manual removal of ammonium chloride solids from the reactor poses several challenges: potential personnel exposure to hazardous chemicals and the time involved in manual solids removal could cause significant reactor down time thus lowering productivity.

In one embodiment, the in situ removal of solid ammonium chloride solids from the reactor is accomplished by vacuum conveying in an automated manner. Vacuum conveying was carried out by using an inert motive gas to fluidize the solids and then remove them from the reactor via venturi effect. The rate of solids removal is correlated to the velocity of the inert gas, as well as the conveying inert gas in the venture (venturi) vacuum system. Inert gas as described herein can be a noble gas or a non-reactive gas such as nitrogen. To help facilitate the solids fluidization and then conveying to the venturi unit, a computational Fluid Dynamic (CFD) simulation or other means can be used to locate inert gas nozzles in the reactor. From the CFD simulation, the end user can calculate the appropriate flow rate of inert gas and determine the optimum operating velocity to convey solids away from the reactor into a vacuum collection system. In one particular embodiment, a flow rate of inert gas, such as 30 standard cubic feet per minute (scfm) can provide from about 80% to about 98% of solids removal within 60 minutes in the test reactor.

In this or other embodiments, the ammonia discharge spargers are positioned in a manner, such that ammonia is discharged tangentially along the reactor internal wall. This arrangement resulted in ammonium chloride formation far from the tip of the spargers thereby alleviating sparger blockage. An additional benefit of the arrangement is to promote MCS/NH$_3$ mixing during the synthesis step by creating convective mixing. In this or other embodiments, an interval impact vibrator, mounted on the reactor external surface, can be used to dislodge the ammonia chloride solids from the reactor internal wall.

The crude mixture containing the TSA is purified by one or more processes to substantially extract the aminosilane product contained therein. The reaction conditions of temperature and pressure for the purification of the crude vary depending upon the purification process used. Examples of suitable purification processes include, but are not limited to, distillation, evaporation, membrane separation, extraction, and combinations thereof. In the embodiment shown in FIG. 1, a crude mixture comprising TSA can be transferred to the distillation column from the collector for further purification. The main impurity within the crude mixture is the excess MCS that is used to manufacture TSA. Trace amount of DSA is occasionally noted. Distillation of crude TSA is relatively straightforward as there is significant difference in boiling points of MCS (−30° C.) and TSA (52° C.). In certain embodiments, it has been possible to obtain a purity level of 99% or greater of TSA and a process yield of 80% or greater.

The following examples illustrate the method for preparing trisilylamine described herein and are not intended to limit it in any way.

EXAMPLES

For the following examples, gas chromatography (GC) were used to analyze the gas-phase products to determine the DSA to TSA conversion, product selectivities, and yields.

Example 1

Solubility of MCS in Liquid Phase TSA

In a 9 liter reactor, 115 grams (gms) of crude TSA and a slight excess of MCS was present. The reactor pressure was 13.7 psia. The reactor temperature was 30° C. At this temperature and pressure conditions, 87% TSA is present as a liquid in the reactor. 44 gms of MCS was added to the reactor and final pressure reached 26.5 psia. It is estimated that approximately 21 grams of MCS dissolved in TSA. This example shows that MCS is soluble in liquid phase TSA. The solubility of MCS is about 20% by weight in the reactor in liquid TSA.

Example 2

Comparison of the Process Kinetics for Forming TSA in Gas Phase versus Liquid Phase Specific experiments were conducted to determine process kinetics for forming TSA in either the gas phase or in the condensed or liquid phase where liquid TSA is present and acts as a solvent. The results are shown in Table 1. Experiments were conducted in both gas phase and liquid phase TSA. The reactions were not isothermal although the final temperature of the reaction was limited to <100° C. The reactions were conducted in a batch wise manner where slight stoichiometric excess (e.g., 1-5%) of MCS relative to NH$_3$ was used and added to the reactor. The reaction was performed in a staged manner wherein the amount of reactants was added periodically to see their impact on reaction composition such as TSA and DSA formation. During the entire reaction, ammonium chloride was formed and remained in the reactor. No reactivity was noted between ammonium chloride and TSA in the reactor.

Gas phase GC analysis was conducted to follow the reaction progress. Results of GC analysis are shown in Table 1. Silane, MCS, DSA and TSA peaks were noted in the GC. Silane is always present as a trace impurity in MCS and accumulates in the vapor phase. At no stage was any monosilylamine (MSA) peak observed. The progress of the reaction was followed by noting the DSA peak. As indicated herein, the intent of the process is to eliminate or greatly reduce formation of DSA without compromising TSA product yield and stability. As DSA continues to react to TSA, more and more solid ammonium chloride will form necessitating solids removal away from the reactor. It was the goal of this process to limit solids formation to a single reactor.

In Table 1, results of several tests are presented. In all cases, GC sample was taken as soon as the batch addition of ammonia was completed. In several cases, a second GC was taken immediately after the first one to determine any changes in DSA conversion as a function of time (approximately 22 minutes which was the sample run time on the GC). The results show that when TSA was present in the gas phase in the reactor, a significant amount of DSA was also present (>50%) and dropped slowly. However, where liquid TSA was present, the DSA concentration immediately after reaction was lowered and continued to drop at a much faster rate as the amount of liquid TSA increased in the reactor. In Example 2f where >90% TSA was present as condensed liquid phase, approximately 1.3% DSA was present. In several subsequent synthesis experiments, TSA density in the reactor was raised >20 gm/liter and trace DSA (<1%) was noted in the gas phase before the crude mixture was transferred to distillation column and/or collector. When the majority of TSA is present in liquid phase, the reaction kinetics are rapid and the formation of TSA can be accomplished in one reactor with reduced formation of the by-product DSA.

TABLE 1

TSA kinetics in Gas and Condensed TSA Phase - MCS Excess: 1.3-4.7% (weight)

| Ex. No. | Elapsed Time min | TSA Density in Reactor gms/l | TSA in Liq. Phase % | GC silane % | GC MCS % | GC DSA % | GC TSA % | DSA/TSA |
|---|---|---|---|---|---|---|---|---|
| 2a | 0:00 | 0.88 | 0.00% | 3.00 | 19.00 | 54.00 | 23.00 | 2.35 |
|    | 0:25 |      |        | 3.00 | 18.40 | 50.60 | 27.90 | 1.81 |
| 2b | 0:00 | 1.73 | 3.60%  | 2.12 | 15.18 | 38.30 | 44.38 | 0.86 |
|    | 0:22 |      |        | 2.32 | 13.90 | 28.90 | 54.90 | 0.53 |
| 2c | 0:00 | 4.16 | 39.90% | 0.05 | 16.47 | 24.40 | 58.14 | 0.42 |
|    | 0:22 |      |        | 0.96 | 14.00 | 11.80 | 73.13 | 0.16 |
| 2d | 0:00 | 7.10 | 76.40% | 2.20 | 17.80 | 5.40  | 74.80 | 0.07 |
| 2e | 0:00 | 14.90| 88.00% | 3.90 | 25.60 | 3.30  | 67.60 | 0.05 |
| 2f | 0:00 | 17.03| 90.21% | 4.7  | 27.9  | 1.3   | 66.2  | 0.02 |

Example 3

Formation of Polysilazane in the Reactor

Several experiments were conducted to determine the amount of polysilazanes formed during TSA synthesis. The reaction was conducted in liquid phase TSA at 3-5% stoichiometric excess of MCS to NH$_3$ and at a temperature of 100° C. or less. Crude TSA was transferred for distillation and polysilazanes were collected in a liquid nitrogen trap such as that shown in FIG. 1. The results are provided in Table 2. The results show that between 4-9% TSA and polysilzanes remain trapped on ammonium chloride and must be carefully removed before ammonium chloride can be safely transferred out of the reactor.

TABLE 2

Amount of TSA and Polysilazane Trapped on Ammonium Chloride

| Crude TSA produced (kg) | (TSA + Polysilazane) Residue Collected (gms) | % Residue |
|---|---|---|
| 2.03 | 98  | 4.83 |
| 2.26 | 106 | 4.69 |
| 1.92 | 175 | 9.11 |
| 2.93 | 141 | 4.81 |

Example 4

TSA was prepared in a liquid phase synthesis in accordance with the methods described herein in a 60-liter reactor. After the reaction and TSA and polysilazane transfer as illustrated in the process shown in FIG. 1, 5.8 Kg of ammonium chloride solids were present in the 60-liter reactor. A vacuum conveyor was used, which incorporated tangentially injected nitrogen and ambient air as conveying fluids, to efficiently remove the solid ammonium chloride.

TABLE 3

Amount of ammonium chloride solids removed, via vacuum conveying, vs. time

| Elapsed Time, Minutes | % Solids Removed from Reactor |
|---|---|
| 20 | 53 |
| 35 | 83 |
| 45 | 94 |

The invention claimed is:

1. A system for preparing trisilylamine, the system comprising:
   a reactor comprising a reaction mixture of trisilylamine which is in communication with monochlorosilane and ammonia and wherein the density of trisilyamine in the reactor ranges from about 1.5 to about 100 grams/liter which react with the reaction mixture to provide a crude mixture comprising monochlorosilane and dichlorosilane in a liquid phase and an ammonium chloride solid wherein the reactor is substantially free of an added solvent;
   a vacuum conveyor for removing the ammonium chloride solid from the reactor; and
   a distillation column wherein the crude mixture is transferred from the reactor to the distillation column and purified in the distillation column to provide trisilylamine at a purity level of 90% or greater.

2. The system of claim 1 wherein the reactor is selected from a batch reactor or a continuous stirred tank reactor.

3. The system of claim 2 wherein the reactor comprises the batch reactor.

4. The system of claim 3 wherein the monochlorosilane is added to the reactor before the ammonia is added to the reactor.

5. The system of claim 1 wherein the density of trisilylamine in the reactor comprises about 1.7 g/l or greater.

6. The system of claim 2 wherein the reactor comprises the continuous stirred tank reactor.

7. The system of claim 1 wherein the trisilylamine is added as a solvent in the reactor.

8. The system of claim 1 wherein the vacuum conveyor comprises in situ vacuum removal.

9. The system of claim 1 wherein an inert gas is used to fluidize the ammonium chloride solids in the reactor to provide fluidized solids.

10. The system of claim 9 wherein the fluidized solids are carried out to a venturi vacuum system via the inert gas for collection and disposal.

11. The system of claim 1 wherein a temperature in the reactor ranges from 20 to 120° C.

12. The system of claim 1 wherein a pressure in the reactor ranges from 0.1 to 115 psia.

13. The system of claim 1 further comprising a collector which is communication with the reactor to collect the crude mixture from the reactor.

14. The system of claim 1 wherein the trisilylamine is purified in the distillation column to a purity level of 99% or greater.

15. The system of claim 1 wherein polysilazanes are removed from the reactor by evaporation and collection.

16. The system of claim 1 wherein the reaction mixture comprises up to 30% by weight stoichiometric excess monochlorosilane relative to ammonia.

17. The system of claim 1 wherein the reaction mixture comprises from about 3%® to about 5% by weight stoichiometric excess monochlorosilane relative to ammonia.

18. A method for preparing trisilylamine, the method comprising:
   providing a reaction mixture of trisilylamine and monochlorosilane into a reactor wherein the reaction mixture is at a temperature and pressure sufficient to provide trisilylamine in a liquid phase wherein the reaction mixture is substantially free of an added solvent and wherein the trisilyamine in the reactor acts as solvent in the reaction mixture;
   contacting the reaction mixture with ammonia to provide a crude mixture comprising trisilylamine and an ammonium chloride solid wherein monochlorosilane is in stoichiometric excess in relation to ammonia; and
   purifiying the crude mixture to provide trisilylamine wherein the trisilyamine is produced at purity level of 90% or greater.

19. The method of claim 18 wherein the method further comprises removing the ammonium chloride solid from the reactor.

20. The method of claim 18 wherein the reactor is selected from a batch reactor or a continuous stirred tank reactor.

* * * * *